United States Patent [19]
Nakamura et al.

[11] Patent Number: 5,784,188
[45] Date of Patent: Jul. 21, 1998

[54] ELECTRO-ABSORPTION OPTICAL MODULATOR AND METHOD FOR FABRICATING THE SAME

[75] Inventors: Shinji Nakamura, Ikoma; Satoshi Kamiyama, Sanda; Kenichi Matsuda, Moriguchi; Yasushi Matsui, Neyagawa, all of Japan

[73] Assignee: Matsushita Electric Industrial Co., Inc., Kadoma, Japan

[21] Appl. No.: 796,934

[22] Filed: Feb. 7, 1997

[30] Foreign Application Priority Data

Feb. 13, 1996 [JP] Japan ................. 8-024952

[51] Int. Cl.⁶ ........................................ G02F 1/03
[52] U.S. Cl. .................. 359/248; 359/245; 359/276; 359/260; 385/2
[58] Field of Search ........................ 359/245, 248, 359/276, 284, 285, 260; 385/1, 2, 4

[56] References Cited

U.S. PATENT DOCUMENTS

| | | | |
|---|---|---|---|
| 4,872,744 | 10/1989 | Abeles et al. | 359/276 |
| 5,016,990 | 5/1991 | Dobson | 359/260 |
| 5,300,789 | 4/1994 | Gorfinkel et al. | 359/248 |
| 5,307,200 | 4/1994 | Yoshida | 359/248 |
| 5,402,259 | 3/1995 | Lembo et al. | 359/245 |
| 5,528,413 | 6/1996 | Ishimura | 359/248 |

FOREIGN PATENT DOCUMENTS 0733926  9/1996  European Pat. Off. .

OTHER PUBLICATIONS

Norbert Linder et al., IEEE Journal of Quantum Electronics, vol. 31, No. 9, Sep. 1995, "Linearity of Double Heterostructure Electroabsorptive Waveguide Modulators."

S. Nakamura et al., Technical Report of the Institute of Electronics, Information and Communication Engineers, OPE 95-142, LQE 95-136, Feb. 15, 1996, "The Low Distortion Design of a MQW-EA Modulator".

Primary Examiner—Loha Ben
Attorney, Agent, or Firm—Renner, Otto, Boisselle & Sklar, P.L.L.

[57] ABSTRACT

An electro-absorption optical modulator, where a waveguide length of the absorption layer is denoted by L, a light confinement coefficient thereof is denoted by $\Gamma$, and a performance factor of the absorption layer at an applied voltage V to an absorption layer is denoted by K(V), has design parameters selected so that a relationship $|K(V)-\Gamma \cdot L| \leq 0.005$ cm is satisfied in a continuous operation range of a quenching ration $T_{Ar}$. The waveguide length L is preferably optimized so as to satisfy $K(V) \approx \Gamma \cdot L$ in the operation range.

7 Claims, 5 Drawing Sheets

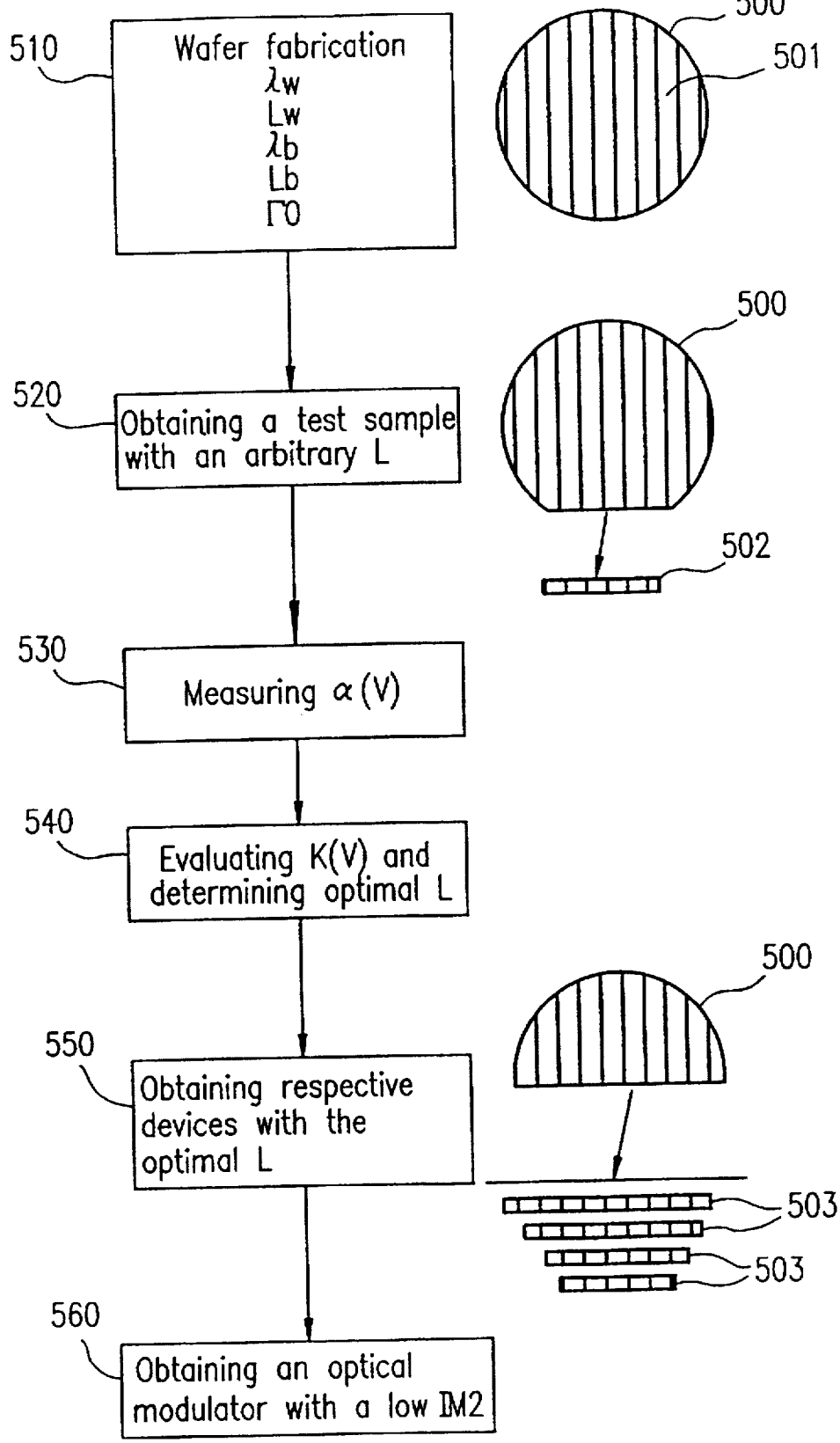

ELECTRO-ABSORPTION OPTICAL MODULATOR AND METHOD FOR FABRICATING THE SAME

BACKGROUND OF THE INVENTION

1. Field of the Invention

The present invention relates to an optical semiconductor device constituting an electro-absorption optical modulator applicable in the field of optical communication and the like, and more specifically, to a technique for reducing the modulation distortion of such an electro-absorption optical modulator.

2. Description of the Related Art

An electro-absorption optical modulator (hereinafter, "EA optical modulator"), realizing a higher indicial response and a considerable reduction in wavelength chirp, is effective for transmitting a modulated signal in a wider frequency band over a longer distance without using any transponders. Hereinafter, a conventional EA optical modulator will be described with reference to FIG. 2.

FIG. 2 schematically shows the cross-sectional structure of a conventional EA optical modulator 50 used in a frequency band of about 1.55 µm. Specifically, an absorption layer of the EA optical modulator 50 has a multi-quantum well (hereinafter, "MQW") structure, so that the EA optical modulator 50 is also referred to as an MQW-EA optical modulator.

In the MQW-EA optical modulator 50, a p-InP first cladding layer 202 is provided on an MQW layer 203 (i.e., an absorption layer) made of InGaAsP. The MQW layer 203 includes optical waveguide layers made of InGaAsP. The p-InP first cladding layer 202 has a trapezoidal cross section. An InGaASP content layer 201 and an Au/Zn/Au first electrode layer 200 are provided on the top surface of the p-InP first cladding layer 202. An SiN protective layer 207 is further provided over the top surface of the MQW-EA optical modulator 50 so as to cover the MQW layer 203, the p-InP first cladding layer 202, the InGaASP contact layer 201 And the Au/Zn/Au first electrode layer 200. A pad-shaped electrode (not shown) having a size of, for example, About 70 µm×about 70 µm is provided at a predetermined position on the SiN protective layer 207, and is electrically connected to the first electrode layer 200 through a contact hole (not shown) provided in the SiN protective layer 207.

Beneath the MQW layer 203 is an n-InP second cladding layer 205 with an n-InP buffer layer 204 therebetween. An Au/Sn second electrode layer 206 is further provided beneath the n-InP second cladding layer 205.

The element length (which is equal to the waveguide length) of the MQW-EA optical modulator 50 is typically about 400 µm, and the light confinement coefficient thereof is typically about 10%.

Conventional EA optical modulators have been applied primarily to BED (base band digital) techniques which are suitable for data transmission requiring low error rate. Although an EA optical modulator typically has-non-linear operational characteristics, no serious disadvantages arise when the EA optical modulator is employed in the DDD technique.

On the other hand, since conventional EA optical modulators have nonlinear operational characteristics, as described above, they are not suitable for use in SCM (Sub-Carrier Multiplexing) technique in which distortion of signals is undesirable. In order to transmit video and/or audio data at extremely high speed in a multiplexing manner by the use of an EA optical modulator, it is required to realize application of the EA optical modulator to the SCM technique, which is a suitable technique for transmitting video and/or audio data in a multiplexing manner.

The output signal of an EA optical modulator includes a fundamental wave component which has been modulated by the linear component with respect to the operational characteristics thereof and distortion components which have been modulated by the non-linear components. When particularly considering the second-order distortion component, the ratio of the second-order distortion component to the fundamental wave component is called a "second-order intermodulation distortion" (hereinafter, "IM2"). The SCM technique requires reduction of the modulation distortion, i.e., the second-order intermodulation distortion (IM2). However, in general, the IM2 of a conventional EA optical modulator is considerably larger than the IM2 of a direct modulation type light-emitting device such as a DFB laser device, the operation of which is controlled by current.

Thus, in order to apply an EA optical modulator to the SCM technique, it is important to reduce the IM2 of the EA optical modulator. For accomplishing this purpose, it is necessary to reduce the second-order distortion component included in the output signal of the EA optical modulator.

SUMMARY OF THE INVENTION

The electro-absorption optical modulator of the present invention includes: a semiconductor multi-layer structure including at least an absorption layer and a pair of cladding layers interposing the absorption layer on both sides thereof; and a pair of electrode layers. A predetermined voltage is applied to the semiconductor multi-layer structure via the electrode layers. When a waveguide length of the absorption layer is denoted by L, a light confinement coefficient thereof is denoted by $\Gamma$, and a performance factor of the absorption layer at an applied voltage V to the absorption layer is denoted by K(V), a relationship $|K(V)-\Gamma \cdot L| \leq 0.005$ cm is satisfied in a continuous operation range Y of a quenching ratio $T_{Att}$, the operation range Y corresponding to about 40% or more of a range X of the quenching ratio $T_{Att}$, the range X providing the quenching ratio $T_{Att}$ representing a ratio of an output light intensity $P_{out}$ to an input light intensity $P_{in}$ ($T_{Att}=P_{out}/P_{in}$) being equal to or larger than 0.01 where a value of the quenching ratio $T_{Att}$ is normalized to be 1 when the applied voltage V to the absorption layer is zero.

In one embodiment of the present invention, the absorption layer has a multi-quantum well structure which includes: a plurality of wall layers; a plurality of barrier layers; and a pair of optical waveguide layers provided so as to interpose the plurality of well layers and the plurality of barrier layers on both sides thereof.

The performance factor K(V) of the absorption layer can be represented as $K(V)=\alpha''(V)/\alpha'(V)^2$ by using a first-order derivative $\alpha'(V)$ and a second-order derivative $\alpha''(V)$ of a light absorption coefficient $\alpha(V)$ of the absorption layer.

Preferably, a relationship $\Gamma \cdot L \approx K(V)$ is satisfied in the operation range Y with respect to the waveguide length L of the absorption layer and the light confinement coefficient $\Gamma$ thereof.

The relationship $\Gamma \cdot L \approx K(V)$ may be accomplished by fine adjustment of the waveguide length L.

The method for fabricating an electro-absorption optical modulator of the present invention includes the steps of: forming a plurality of waveguide structures on a substrate, each of the waveguide structures including at least an absorption layer and a pair of cladding layers interposing the absorption layer on both sides thereof; cutting out a test sample device having a waveguide length of a predetermined value from the substrate; measuring a light absorption coefficient—an applied voltage characteristics of the absorption layer of the test sample device; determining an optimal value of the waveguide length by using the measured characteristics; and cutting out an optical modulator device having the optimal waveguide length from the substrate.

Preferably, when the waveguide length of the absorption layer is denoted by L, a light confinement coefficient thereof is denoted by $\Gamma$, and a performance factor of the absorption layer at an applied voltage V to the absorption layer is denoted by K(V), the optimal waveguide length is determined such that a relationship K(V)=$\Gamma \cdot$L is satisfied in a continuous operation range Y of a quenching ratio $T_{Att}$, the operation range Y corresponding to about 40% or more of a range X of the quenching ratio $T_{Att}$, the range X providing the quenching ratio $T_{Att}$ representing a ratio of an output light intensity $P_{out}$ to an input light intensity $P_{in}$ ($T_{Att}$=$P_{out}$/$P_{in}$) being equal to or larger than 0.01 where a value of the quenching ratio $T_{Att}$ is normalized to be 1 when the applied voltage V to the absorption layer is zero.

Thus, the invention described herein makes possible the advantage of (1) providing an electro-absorption optical modulator which enables linear operation over a wide operation range and has reduced modulation distortion in the output signal thereof, and (2) providing a method for fabricating such an electro-absorption optical modulator.

These and other advantages of the present invention will become apparent to those skilled in the art upon reading and understanding the following detailed description with reference to the accompanying figures.

BRIEF DESCRIPTION OF THE DRAWINGS

FIG. 5 is a chart illustrating the fabrication process steps of the EA optical modulator according to the present invention.

DESCRIPTION OF THE PREFERRED EMBODIMENTS

Figure 1A:
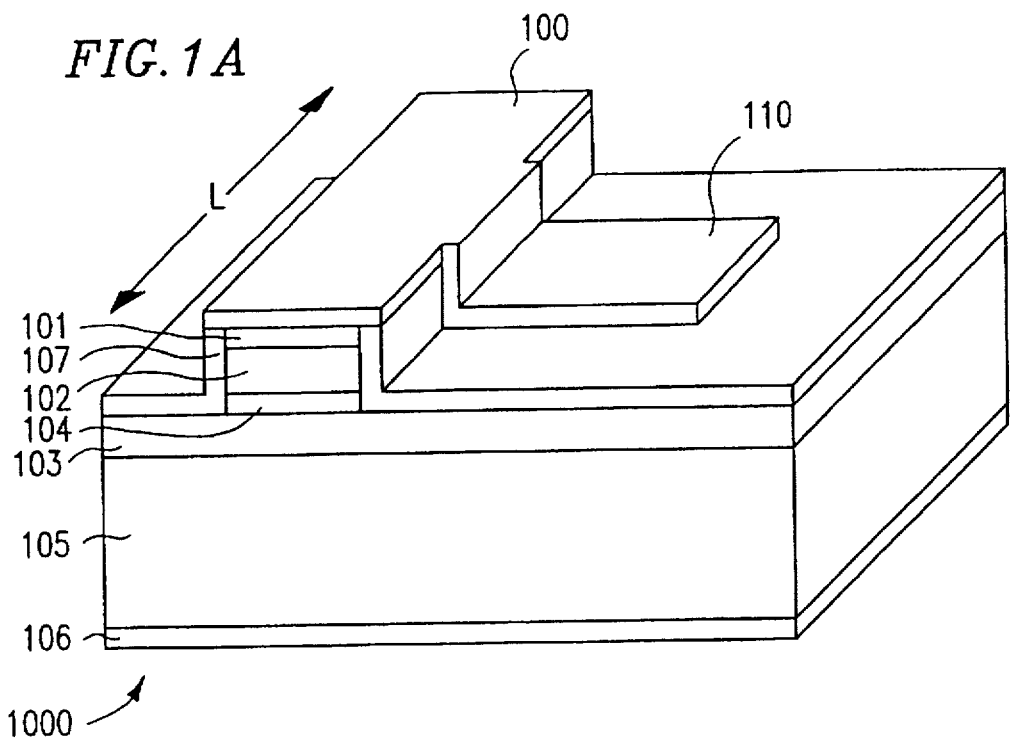
FIG. 1A is a perspective view schematically showing the structure of an EA optical modulator in an exemplary embodiment of the present invention.

In advance of describing the specific embodiments of the present invention, the results of the study performed by the present inventors during the processes for realizing the present invention will be described.

A quenching ratio $T_{Att}$(V) representing the ratio of an output power $P_{out}$ to an input power $P_{in}$ (i.e., $T_{Att}$(V)=$P_{out}$/$P_{in}$) is an exemplary parameter indicating the operational characteristics of an EA optical modulator. More specifically, assuming that a voltage applied to an absorption layer included in the EA optical modulator is V, the light-absorption coefficient of the absorption layer is $\alpha$(V) where $\alpha$(v)>0, a light confinement coefficient is $\Gamma$, and a waveguide length is L, the quenching ratio $T_{Att}$(V) is given by the following Equation 1:

$$T_{Att}(V) = \exp(-\alpha(V) \cdot \Gamma \cdot L) \qquad (1)$$

It is noted that the value of a quenching ratio $T_{Att}$(V) is typically normalized to be 1 when the voltage V to be applied to the absorption layer of the EA optical modulator is zero.

Herein, the product $\Gamma \cdot$L, obtained by multiplying the light confinement coefficient $\Gamma$ by the waveguide length L, of Equation 1 is one of the parameters which contributes to (i.e., has some influence on) the operational characteristics of the EA optical modulator.

The second-order inter-modulation distortion (TM2) of the EA optical modulator lo defined as a ratio of the second-order distortion component to the fundamental wave component in the output signal thereof, as previously described. Among these components, the second-order distortion component is approximately in proportion to a second-order derivative $T_{Att}''$(V) obtainable by subjecting the quenching ratio $T_{Att}$(V) to a Taylor expansion with respect to the operation voltage V. Consequently, in order to reduce the second-order intermodulation distortion (IM2), this second-order derivative $T_{Att}''$(V) is required to be small.

More specifically, $T_{Att}''$(V) is given by the following Equation 2 by subjecting Equation 1 to a second-order differentiation:

$$T_{Att}''(V) = \Gamma \cdot L \cdot (\Gamma \cdot L \cdot \alpha'(V)^2 - \alpha''(V)) \cdot T_{Att} \qquad (2)$$

where $\alpha'$(V) and $\alpha''$(V) included in Equation 2 are a first-order derivative and a second-order derivative of the light-absorption coefficient $\alpha$(V), respectively.

Thus, as is clear from Equation 2, in order to reduce $T_{Att}''$(V), the following functional component included in the parentheses on the right side of Equation 2:

$$\Gamma \cdot L \cdot \alpha'(V)^2 - \alpha''(v) \qquad (3)$$

is required to be reduced.

When this Relation (3) is divided by $\alpha'$(V)$^2$, then $$(\Gamma \cdot L \cdot \alpha'(V)^2 - \alpha''(V))/\alpha'(V)^2 = \Gamma \cdot L - (\alpha''(V)/\alpha'(V)^2) = \Gamma \cdot L - K(V) \qquad (4)$$

is obtained. Here, K(V) included in Equation 4 is a performance factor of the absorption layer, which is defined by the following Equation 5:

$$K(V) = \alpha''(V)/\alpha'(V)^2 \qquad (5)$$

When the following relationship:

$$\Gamma \cdot L = K(v) \qquad (6)$$

is satisfied, the following condition:

$$\Gamma \cdot L - K(V) = 0 \qquad (7)$$

is satisfied. Accordingly, the second-order derivative $T_{Att}''$(V) of the quenching ratio becomes zero and the second-order intermodulation distortion (IM2) becomes approximately zero.

More specifically, the absorption layer is designed to be optimized so that the performance factor K(V) thereof exhibits less deviation over a wider operation range. Furthermore, the product Γ·L is optimized so that the functional component as defined by Relationship 3 becomes smaller over a wider operation range. This optimization enhances the linearity of the operational characteristics of the EA optical modulator (specifically, the linearity of the graph representing the applied voltage—the quenching ratio characteristics thereof).

In order to realize multi-channel multiplexed digital broadcasting of high-quality moving pictures by a 64 quadrature amplitude modulation (QAM) technique or a more multivalent QAM technique using an EA optical modulator, the second-order intermodulation distortion (IM2) is required to be sufficiently small. More specifically, according to the results of the study obtained by the present inventors, the previously mentioned function (Γ·L–K(V)) is required to satisfy tho relationship:

$$|\Gamma \cdot L - K(V)| \leq 0.005 \text{ cm} \tag{8}$$

in order to fulfill the above-mentioned objective. It is noted that when |Γ·L–K(V)|>0.005 cm, then an IM2 small enough to transmit a moving picture with high quality in a multiplexed manner cannot be obtained.

In addition, in order to transmit a high-quality digital video (e.g., a high-quality moving picture), the S/N ratio of the EA optical modulator is required to be large, thereby suppressing noise. For that purpose, the amplitude of the modulated output light is required to be sufficiently large while satisfying the above-described relationship |Γ·L–K(V)| ≤ 0.005 cm.

More specifically, a range of the quenching ratio $T_{Att}(V)$ (=$P_{out}/P_{in}$) in which the relationship |Γ·L–K(V)| ≤ 0.005 cm is satisfied (i.e., the operation range effective as a low-distortion range in the optical output) is required to be sufficiently large as compared with a whole range of the quenching ratio $T_{Att}(V)$ (=$P_{out}/P_{in}$) corresponding to an optical output range where the quenching ratio $T_{Att}(V)$ (=$P_{out}/P_{in}$) ≤ 0.01. Typically, it is preferable that a range of the quenching ratio $T_{Att}(V)$ corresponding to the operation range effective as a low-distortion range in the optical output (i.e., a range in which a linear characteristics thereof can be obtained) is about 40% or more of the whole range of the quenching ratio $T_{Att}(V)$ corresponding to an optical output range where tho quenching ratio $T_{Att}(V)$ (–$P_{out}/P_{in}$) ≤ 0.01.

Based on the above-described observations obtained by the present inventors, the EA optical modulator of the present invention is configured such that the performance factor K(V) of the absorption layer, given as Equation 5, becomes substantially continuously constant (i.e., K(V)≈C where C is constant) in a range of the quenching ratio $T_{Att}(V)$ corresponding to about 40% or more of the optical output range where the quenching ratio $T_{Att}(V)$ (=$P_{out}/P_{in}$) >0.01. Furthermore, by designing the EA optical modulator such that the product Γ·L of the light confinement coefficient Γ and the waveguide length L of the absorption layer becomes substantially equal to the constant value of the performance factor (i.e., Γ·L ≈K(V)≈C), the operation range in which the above-described preferred relationship |Γ·L–K (V)|≤0.005 cm is continuously satisfied becomes wider. Consequently, the second-order intermodulation distortion (IM2) is reduced. Thus, the modulation distortion can be considerably reduced and a higher SIN ratio can be obtained in tho EA optical modulator of the present invention as compared to a conventional ones. Consequently, the present invention can provide an EA optical modulator enabling a multi-channel multiplexed digital transmission of high-quality moving pictures by the means of a 64 QAM technique or a more multivalent QAM technique.

Hereinafter, an exemplary preferred embodiment of the present invention resulting from the above-described study by the present inventors will be described with reference to the accompanying drawings.

FIG. 1A is a perspective view showing the structure of an EA optical modulator 1000 of the present invention. It is noted that in the EA optical modulator 1000, absorption layer has a SCH-MQW structure (herein, the term "SCH" means "separate confinement heterostructure"). Consequently, the absorption layer of the EA optical modulator 1000 is also referred to as the "MQW layer", and the EA optical modulator 1000 is also referred to as the "MQW-EA optical modulator 1000".

Figure 1B:
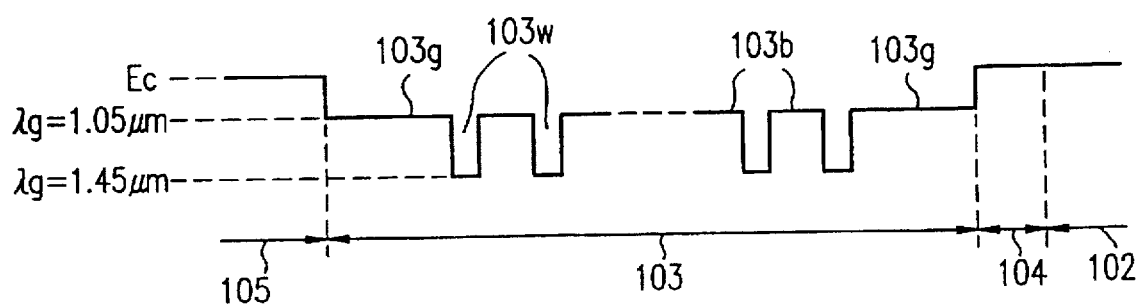
FIG. 1B is a diagram schematically showing the energy band at the absorption layer and in the vicinity thereof included in the EA optical modulator shown in FIG. 1A.
Figure 2:
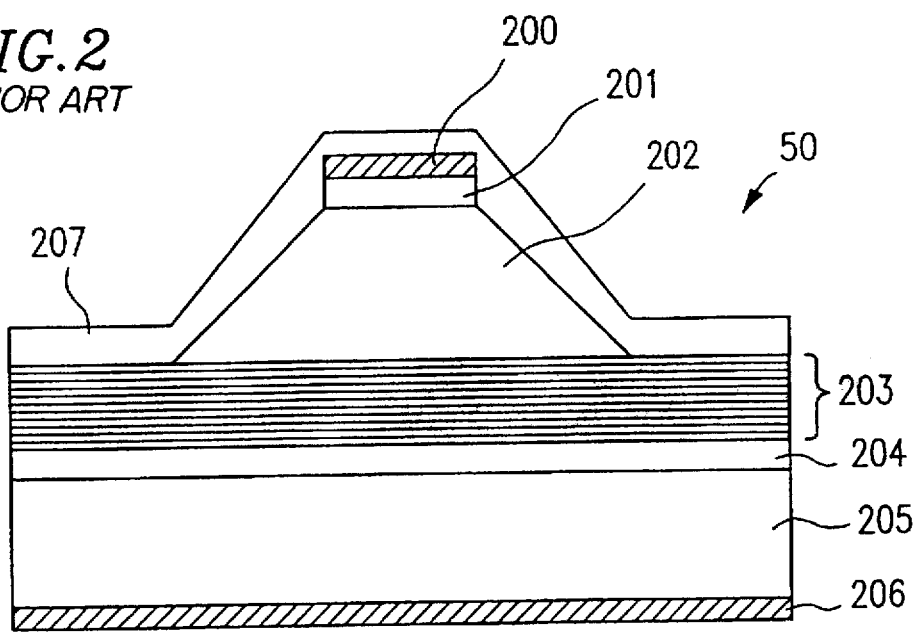
FIG. 2 is a cross-sectional view schematically showing the structure of an exemplary conventional EA optical modulator.

FIG. 1B is a diagram schematically showing the energy band at the MQW layer (the absorption layer) and in the vicinity thereof included in the MQW-FA optical modulator 1000.

In the MQW-EA optical modulator 1000, a p-InP first cladding layer 102 is provided over the MQW layer 103 made of InGaAsP via an undoped InP layer 104. The MQW layer 103 included optical waveguide layers made of InGaAsP. The undoped InP layer 104 is provided for preventing Zn (which is a p-type dopant included in the p-InP first cladding layer 102) from diffusing into the MQW layer 103. The undoped IniP layer 104 and the p-InP first cladding layer 102 are provided in a stripe shape. An InGaAsP contact layer 101 and all Au/Zn/Au first electrode layer 100 are provided on the top surface of the p-InP first cladding layer 102.

An SiO₂ protective layer 107 is further provided on the upper surface of the MOW-EA optical modulator 1000 so as to cover the top surface of the MQW layer 103 and the side surfaces of the undoped InP layer 104, the p-InP first cladding layer 102 and the InGaAsP contact layer 101. Alternatively, the protective layer 107 may be made of a material other than SiO₂ (e.g., SiN, polyimide, or the like).

A bonding pad 110 having a predetermined size of, for example, about 70 μm×about 70 μm is provided at a predetermined position on the SiO, protective layer 107 and is electrically connected to the first electrode layer 100.

On the other hand, beneath the MOW layer 102, an n-InP second cladding layer 105 is provided, and an Au/Sn second electrode layer 106 is further provided beneath the n-InP second cladding layer 105.

The element length L (which is equal to the waveguide length in the MQW layer 103) of the MQW-EA optical modulator 1000 is typically about 1600 μm, and the light confinement coefficient of the MOW layer 103 is typically about 10%.

As shown in the energy band diagram in FIG. 1B, the MQW layer 103 of the MQW-EA optical modulator 1000 includes: 10 well layers 103w (only four of them are shown), 9 barrier layers 103b (only two of them are shown), and two optical waveguide layers 103g provided so as to sandwich the 19 layers 103w and 103b in total from both sides thereof. Each of the optical waveguide layers 103g, the well layers, 103w and the barrier layers 103h is an undoped InGaAsP layer. The thickness of each optical waveguide layer 103g is about 110 nm, that of each well layer 103w is about 7 nm and that of each barrier layer 103b is about 12 nm. Each optical waveguide layer 103g and each barrier layer 103b have such a composition that each of the layers 103g and 103b has a bandgap width corresponding to a composition wavelength $\lambda_g$—about 1.05 μm. Each well layer 103w has such a composition that each layer 103w has a bandgap width corresponding to a composition wavelength $\lambda_g$=about 1.45 μm.

Figure 3A:
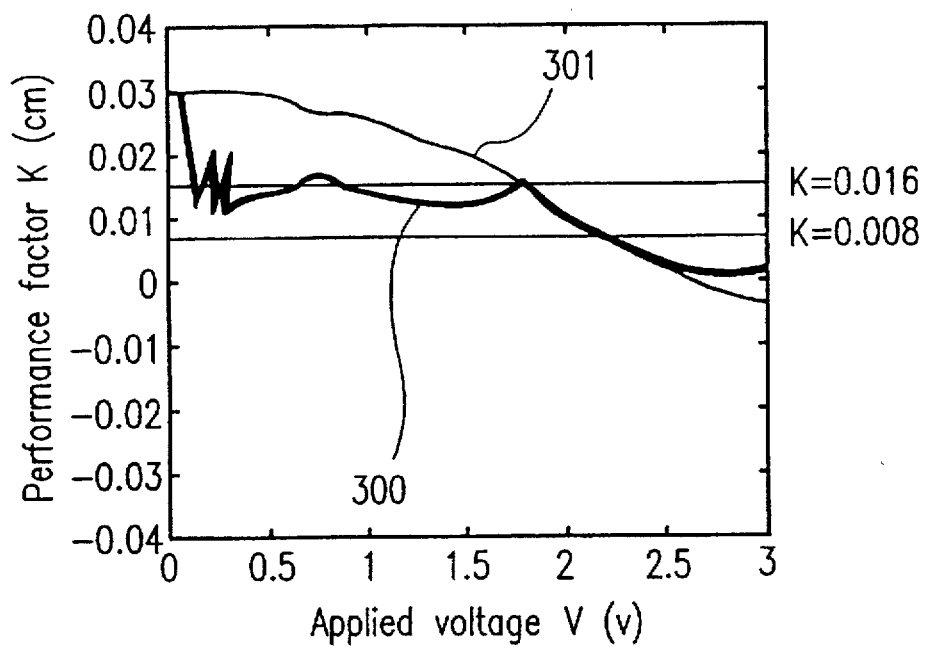
FIG. 3A is a graphic representation showing the dependence of the performance factor K(U) of the absorption layer included in the EA optical modulator upon the applied voltage V.

FIG. 3A is a graphic representation showing the dependence of the performance factor K of the MQW layer upon the applied voltage V. In FIG. 3A, a graph 301 represents the data measured in a conventional structure, while a graph 300 represents the data measured in the structure of the present invention as described with reference to FIG. 1A.

Figure 3B:
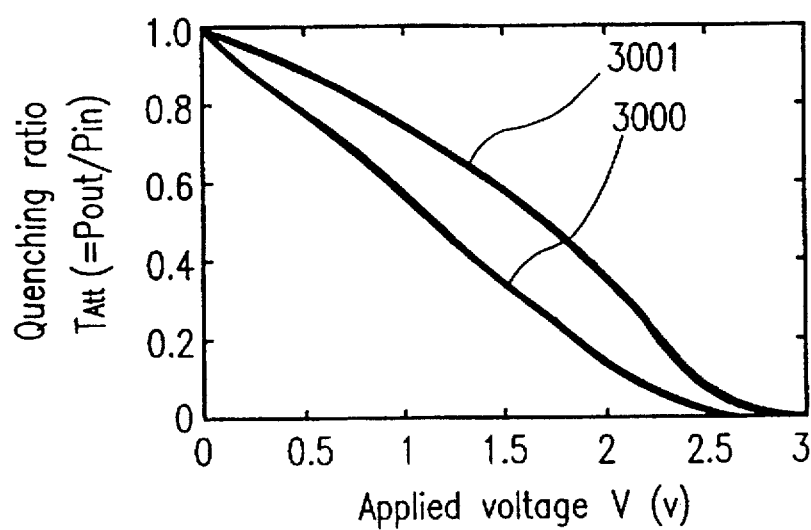
FIG. 3B is a graphic representation showing the dependence of the quenching ratio $P_{out}/P_{in}$ of the EA optical modulator upon the applied voltage V.

FIG. 3B is a graphic representation showing the dependence of the quenching ratio $P_{out}/P_{in}$ upon the applied voltage V for these two cases. Specifically, in FIG. 3B, a graph 3001 represents the data measured in a conventional structure, while a graph 3000 represents the data measured in the structure of the present invention as described with reference to FIG. 1A.

As described previously, in an EA optical modulator, when the relationship $K(V) \approx \Gamma \cdot L$ is satisfied, the second-order intermodulation distortion (IM2) is reduced so that the modulation distortion in the optical output is reduced. However, in the case of the conventional structure represented by the graph 301 in FIG. 3A, as the applied voltage V is varied, the performance factor K(v) is also gradually varied. Thus, there is no applied voltage range where the variation of K(V) becomes small (i.e., the graph 301 representing K(V) in FIG. 3A becomes flat).

More specifically, in the graph 301 corresponding to the conventional structure, when $\Gamma \cdot L$ about 0.008 cm, for example, $K(V) \approx \Gamma \cdot L$ is locally accomplished at around an applied voltage V of about 2.2 V. Thus, at least in the vicinity of this operation point, the preferable relationship $|\Gamma \cdot L - K(V)| \leq 0.005$ cm is satisfied so that the second-order intermodulation distortion (IM2) is reduced. However, the above-described relationship is no longer satisfied at the points away from this operation point, and thus IM2 and the modulation distortion cannot be reduced there.

In other words, with reference to FIG. 3E, a graph 3001 representing the data for the conventional structure seems to locally exhibit good linearity at around the applied voltage V=about 2.2 V. However, when a wider range is used for the modulation, the linearity of the modulation characteristics significantly decreased. Thus, when the modulation distortion is intended to be decreased in the conventional structure of the EA optical modulator, the possible operation range is adversely limited to the vicinity of a particular operation point and such a modulator cannot be operated with a large modulation amplitude.

On the other hand, in the EA optical modulator 1000 of the present invention having a structure shown in FIG. 1A, as represented by the graph 300 in FIG. 3A, $K(V)-0.016$ cm$\pm 0.005$ cm is achieved in a relatively wide range of the applied voltage from about 0.25 V to about 1.8 V, so that K(V) is less varied with respect to the variation of the applied voltage in that range. Thus, by adjusting the waveguide length L in such a manner that $\Gamma \cdot L$ becomes about 0.016 cm, the previously described preferred relationship $|\Gamma \cdot L - K(V)| \leq 0.005$ cm is continuously satisfied in a relatively wide range of the applied voltage from about 0.25 V to about 1.8 V. As a result, the modulation distortion is reduced to such a low level as to satisfactorily transmit moving pictures of high quality in a multiplexed manner by a QAM technique.

With reference to FIG. 3B, a graph 3000 representing the data for the EA optical modulator 1000 of the present invention exhibits satisfactory linearity in the previously mentioned range of the applied voltage (i.e., from about 0.25 V to about 1.8 V). Consequently, even when the modulation is performed using the whole range from about 0.25 V to about 1.8 V, a low send-order intermodulation distortion (IM2) can be realized.

Furthermore, the aforementioned range of the applied voltage from about 0.25 V to about 1.8 V occupies about 60% of a whole range of the applied voltage corresponding to the optical output range in which the quenching ratio $T_{An}>0.01$. Consequently, a modulation region (i.e., an operation range effective as a low-distortion range in the optical output) which is large enough for transmitting high-quality moving pictures in a multiplexed manner can be obtained. More specifically, a large modulation amplitude which is one-half (about 30%) of the aforementioned 60% range of a whole range of the applied voltage corresponding to the optical output range in which the quenching ratio $T_{An} \geq 0.01$ is allowed to be employed for the modulation. Thus, a low-distortion modulation is realized with such a large amplitude, and high-quality moving pictures can be transmitted in a multiplexed manner by a QAM technique.

Figure 4:
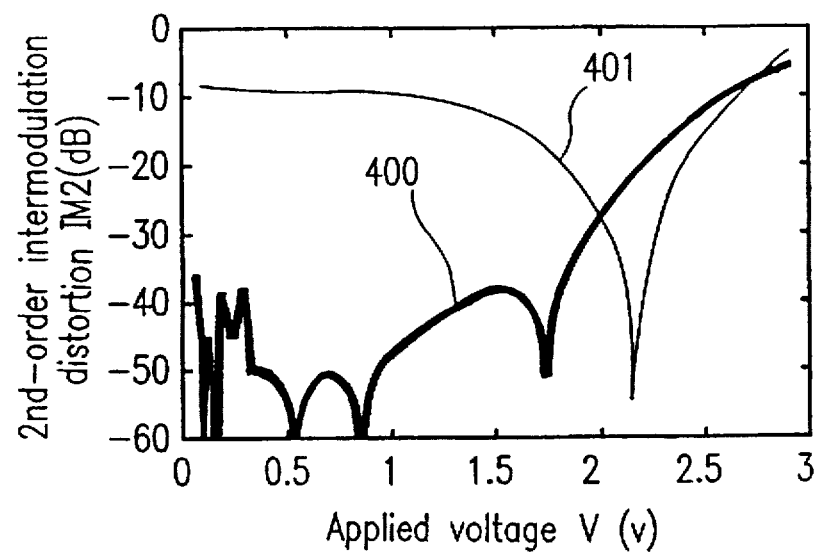
FIG. 4 is a graphic representation showing the dependence of the second-order intermodulation distortion (IM2) of the EA optical modulator upon the applied voltage V.

FIG. 4 is a graphic representation showing the dependence of the second-order intermodulation distortion (IM2) upon the applied voltage V. In FIG. 4, a graph 401 represents the data measured in a conventional structure, while a graph 400 represents the data measured in the structure of the present invention as described with reference to FIG. 1A.

As is clear from the comparison between these graphs 400 and 401, under the structure of the present invention (see the graph 400 in FIG. 4), IM2 is considerably reduced in a wide range of the applied voltage from about 0.25 V to about 1.8 V, as compared with the conventional structure (see the graph 401 in FIG. 4). As described above, this range of the applied voltage from about 0.25 V to about 1.8 V corresponds to a large operation range, and consequently, low-distortion modulation is realized with a large amplitude. As a result, a multi-channel large-capacity digital multiplexed transmission of high-quality moving pictures is realized by a QAM technique.

The optimization of $\Gamma \cdot L$ for realizing the relationship $\Gamma \cdot L \approx K(V)$ can be conducted during a process step of adjusting the waveguide length L after the wafer (substrate) fabrication process has been performed. Hereinafter, the fabrication process steps (including this adjustment process step) of the EA optical modulator of the present invention will be described with reference to FIG. 5.

First, in Step 510, a wafer 500 including the EA optical modulator 1000 having the structure described with reference to FIG. 1A is formed. More specifically, a plurality of continuous ridge waveguide structures 501 arranged in parallel to each other are formed on the wafer (the substrate) 500. Various design parameters for the respective semiconductor layers included in the MQW layer 103 constituting the absorption layer, such as the composition wavelength $\lambda$ of the well layers, the thickness $L_w$ of the well layers, the composition wavelength $\lambda_b$ of the barrier layers, the thickness $T_b$ of the barrier layers, the light confinement coefficient $\Gamma$, and the like, are set at the respective predetermined values.

From the wafer 500 formed in Step 510, it is possible to cut out devices with the length of the semiconductor structure (i.e., the ridge waveguide structure 501) including the p-InP first cladding layer 102, the MQW layer 103, the n-InP second cladding layer 105 and the like (i.e., the resonator length L of the EA optical modulator 1000) being set at an arbitrary value, while regarding the size of the wafer 500 as an upper limit. Thus, in Step 520, a device 502 having a predetermined waveguide length $L_0$ (e.g., $L_0$=about 0.08 cm) is cut out from one end of the wafer 500 as a test sample device 502 for determining operational characteristics thereof. Here, $L_0$ is a waveguide length of the test sample device 502. It is noted that, in actuality, the test sample device 502 is obtained by further dividing the shape denoted as 502 in FIG. 5 through cleavage.

Then, the quenching ratio—the applied voltage characteristics of the cut out test sample device 502 are measured.

The light confinement coefficient $\Gamma$ of an optical waveguide included in the test sample device 502 can be precisely calculated by a numerical analysis using the design parameters. Thus, in Step 530, the light absorption coefficient—the applied voltage characteristics (i.e., $\alpha(V)$ characteristics) are obtained based on the value of the light confinement coefficient $\Gamma$ calculated by the numerical analysis and the quenching ratio—applied voltage characteristics measured in Step 520.

Next, in Step 540, the performance factor K(V) of the MQW layer is calculated based on the $\alpha(V)$ characteristics obtained in Step 530. From this calculation result, the variation of K(V) is found to be small in the vicinity of a certain value (e.g., K(V)$\approx$0.0016). By using this K(V) value, the optimum value of the product $\Gamma \cdot L$ (e.g., $\Gamma \cdot L$=about 0.016) can be determined. Consequently, a waveguide length L satisfying $\Gamma \cdot L$=about 0.016 is determined as an optimum value thereof.

Subsequently, in Step 550, optical modulator device 503 having the optimal waveguide length L determined in Step 540 are cut out from the remaining part of the wafer 500. In actuality, the shape denoted as 503 shown in FIG. 5 is further divided through cleavage into the individual optical modulator devices 503 (Step 560), thereby finally forming the EA optical modulators of the present invention having a low second-order intermodulation distortion (IM2).

In the above-described series of the process steps of the invention, it is possible to conduct adjustment process for improving a linearity of the quenching ration—the applied voltage characteristics of the optical modulator (specifically, the adjustment of the waveguide length L at the optimal value) after the wafer fabrication process has finished. Accordingly, even when a certain parameter (for example, a thickness, a composition, and/or an impurity concentration of the semiconductor layers, a shape of the waveguide, the stripe width of the ridge portion, or the like) may be offset from the intended design value during the process steps for fabricating the semiconductor layers, the electrode layers, and/or the optical waveguide, such an offset can be compensated for in the succeeding process step (i.e., the optimization step of the waveguide length) so as to achieve the best operational performance, as previously explained. Consequently, a high production yield can be achieved.

Even when the above-described EA optical modulator according to the present invention is applied to an SCH transmission using a technique other than the QAM technique, the same effects as those described above can also be attained.

In addition, in the case where the EA optical modulator according to the present invention is applied to a data transmission using a BBD technique, the error generation ratio can be reduced at the same modulation rate, and the modulation rate causing the same error generation rate can be made lighter, as compared with a conventional modulator.

In the above, the present invention is explained by way of example the structure in which the absorption layer has a MOW-structure (the SCH-MQW structure). It should be noted, however, the present invention can be applied to other structures. It should be appreciated that similar advantages as described above are also obtainable in the EA optical modulator having a different structure.

As is apparent from the foregoing description, the present invention provides an electro-absorption (EA) optical modulator enabling linear operation in a wide operation range and having reduced modulation distortion in the output signal thereof.

Since the adjustment for improving the linearity of the quenching ratio—applied voltage characteristics of the RA optical modulator can be performed during a process step posterior to the wafer process, an EA optical modulator can be fabricated at a high yield.

As a result, the EA optical modulator according to the present invention is applicable to a multi-channel multiplexed digital transmission of high-quality moving pictures by means of a 64 QAM technique or a more multivalent QAM technique.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electro-absorption optical modulator comprising:

a semiconductor multi-layer structure including at least an absorption layer and a pair of cladding layers interposing the absorption layer on both sides thereof; and a pair of electrode layers, wherein a predetermined voltage is applied to the semiconductor multi-layer structure via the electrode layers, and wherein, when a waveguide length of the absorption layer is denoted by L, a light confinement coefficient thereof is denoted by $\Gamma$, and a performance factor of the absorption layer at an applied voltage V to the absorption layer is denoted by K(V), a relationship $|K(V) - \Gamma \cdot L| \leq 0.005$ cm is satisfied in a continuous operation range Y of a quenching ratio $T_{Att}$, the operation range Y corresponding to about 40% or more of a range X of the quenching ratio $T_{Att}$, the range X providing the quenching ratio $T_{Att}$ representing a ratio of an output light intensity $P_{out}$ to an input light intensity $P_{in}$ ($T_{Att}$=$P_{out}/P_{in}$) being equal to or larger than 0.01 where a value of the quenching ratio $T_{Att}$ is normalized to be 1 when the applied voltage to the absorption layer is zero.

2. An electro-absorption optical modulator according to claim 1, wherein the absorption layer has a multi quantum wall structure which comprises:

a plurality of wall layers;

a plurality of barrier layers; and a pair of optional waveguide layers provided so as to interpose the plurality of well layers and the plurality of barrier layers on both sides thereof.

3. An electro-absorption optical modulator according to claim 1, wherein the performance factor K(V) of the absorption layer is represented as K(V)=$\alpha''(V)/\alpha'(V)^2$ by using a first-order derivative $\alpha'(V)$ and a second-order derivative $\alpha''(V)$ of a light absorption coefficient $\alpha(V)$ of the absorption layer.

4. An electro-absorption optical modulator according to claim 1, wherein a relationship $\Gamma \cdot L \approx K(V)$ is satisfied in the operation range Y with respect to the waveguide length L of the absorption layer and the light confinement coefficient $\Gamma$ thereof.

5. An electro-absorption optical modulator according to claim 4, wherein the relationship $\Gamma \cdot L \approx K(V)$ is accomplished by fine adjustment of the waveguide length L.

6. A method for fabricating an electro-absorption optical modulator, comprising the steps of:

forming a plurality of waveguide structures on a substrate, each of the waveguide structures including at least an absorption layer and a pair of cladding layers interposing the absorption layer on both sides thereof;

cutting out a test sample device having a waveguide length of a predetermined value from the substrate;

measuring a light absorption coefficient—an applied voltage characteristics of the absorption layer of the test sample device;

determining an optimal value of the waveguide length by using the measured characteristics; and cutting out an optical modulator device having the optimal waveguide length from the substrate.

7. A method for fabricating an electro-absorption optical modulator according to claim 6, wherein, when the waveguide length of the absorption layer is denoted by L, a light confinement coefficient thereof is denoted by $\Gamma$, and a performance factor of the absorption layer at an applied voltage V to the absorption layer is denoted by K(V), the optimal waveguide length is determined such that a relationship $K(V) \approx \Gamma \cdot L$ is satisfied in a continuous operation range Y of a quenching ratio $T_{Att}$, the operation range Y corresponding to about 40% or more of a range X of the quenching ratio $T_{Att}$, the range X providing the quenching ratio $T_{Att}$ representing a ratio of an output light intensity $P_{out}$ to an input light intensity $P_{in}$ ($T_{Att} = P_{out}/P_{in}$) being equal to or larger than 0.01 where a value of the quenching ratio $T_{Att}$ is normalized to be 1 when the applied voltage V to the absorption layer is zero.

* * * * *

UNITED STATES PATENT AND TRADEMARK OFFICE
CERTIFICATE OF CORRECTION

PATENT NO.: 5,784,188　　　　　　　　Page 1 of 3

DATED: July 21, 1998

INVENTOR(S): Shinji Nakamura et al.

It is certified that error appears in the above-identified patent and that said Letters Patent is hereby corrected as shown below:

On the title page, Item [57]

In The Abstract:

Line 9, please replace "optimizrd" with --optimized--.

Column 1, line 35, please replace "InGaASP" with --InGaAsP--.
Column 1, line 41, please replace "And the" with --and the--.
Column 1, line 43, please replace "About" with --about--.
Column 1, line 56, please replace "BED" with --BBD--.
Column 1, line 58, please replace "has-non-linear" with --has non-linear--.
Column 1, line 60, please replace "DDD" with --BBD--.
Column 3, line 47, please replace "K(U)" with --K(V)--.
Column 4, equation 1, please replace "$T_{Att}(V)$-" with --$T_{Att}(V)$=--.
Column 4, line 21, please replace "lo defined" with --is defined--.
Column 4, equation 5, please replace "K(V)-" with --K(V)=--.
Column 4, equation 6, please replace "=K(v)" with --=K(V)--.

UNITED STATES PATENT AND TRADEMARK OFFICE
CERTIFICATE OF CORRECTION

PATENT NO.: 5,784,188

DATED: July 21, 1998

INVENTOR(S): Shinji Nakamura et al.

It is certified that error appears in the above-identified patent and that said Letters Patent is hereby corrected as shown below:

Column 5, line 37, please replace "$\leq 0.01$" with --$\geq 0.01$--.
Column 5, line 43, please replace "$(-P_{out}/P_{in})$" with --$(=P_{out}/P_{in})$--.
Column 5, line 52, please replace ">0.01" with --$\geq 0.01$--.
Column 5, line 61, please replace "SIN" with --S/N--.
Column 6, line 7, please insert --an-- between "1000," and "absorption".
Column 6, line 16, please replace "MQW-FA" instead of "MQW-EA".
Column 6, line 21, please replace "included" with --includes--.
Column 6, line 25, please replace "IniP" with --InP--.
Column 6, line 27, please replace "all" with --an--.
Column 6, line 41, please replace "MOW" with --MQW--.
Column 6, lines 56-57, please replace "the well layers, 103w" with --the well layers 103w--.
Column 6, line 57, please replace "103h" with --103b--.
Column 6, line 64, please replace "$\lambda_g$--about" with --$\lambda_g$=about--.

UNITED STATES PATENT AND TRADEMARK OFFICE
CERTIFICATE OF CORRECTION

PATENT NO.: 5,784,188

DATED: July 21, 1998

INVENTOR(S): Shinji Nakamura et al.

It is certified that error appears in the above-identified patent and that said Letters Patent is hereby corrected as shown below:

Column 7, line 47, please replace "K(V)–0.016 cm" with --K(V)=0.016 cm--.
Column 8, line 5, please replace "$T_{Att} > 0.01$" with --$T_{Att} \geq 0.01$--.
Column 8, line 49, please replace "$\lambda$" with --$\lambda_w$--.
Column 9, line 61, please replace "MOW-structure" with --MQW-structure--.

In The Claims:

Claim 1, line 19, please replace "$T_{Att}$–" with --$T_{Att}$=--.
Claim 2, line 6, please replace "optional" with --optical--.

Signed and Sealed this

Twenty-seventh Day of March, 2001

Attest:

NICHOLAS P. GODICI

Attesting Officer    Acting Director of the United States Patent and Trademark Office